Nov. 3, 1942. J. W. BARNWELL 2,301,166
ROAD SCRAPER CONTROL
Filed Sept. 7, 1939

Inventor
John W. Barnwell
By
A. F. Flournoy, Attorney

Patented Nov. 3, 1942

2,301,166

UNITED STATES PATENT OFFICE 2,301,166

ROAD SCRAPER CONTROL

John W. Barnwell, Shreveport, La.

Application September 7, 1939, Serial No. 293,671

4 Claims. (Cl. 37—140)

My invention relates to road scrapers, and more particularly to the self-dumping type of scraper.

An object of my invention is to provide a control means for a self-dumping scraper.

Another object of my invention is to provide a means for manually controlling a scraper from the driver's seat on the scraper, or tractor or the like attached to the scraper.

Another object of my invention is to provide a manually controlled scraper control with a means for automatically setting the scraper for scraping position or dumping position when the control is no longer under manual control.

Other objects and advantages of my invention will appear in the following detailed description of the drawing illustrating a preferred embodiment of my invention, wherein.

Figure 2:
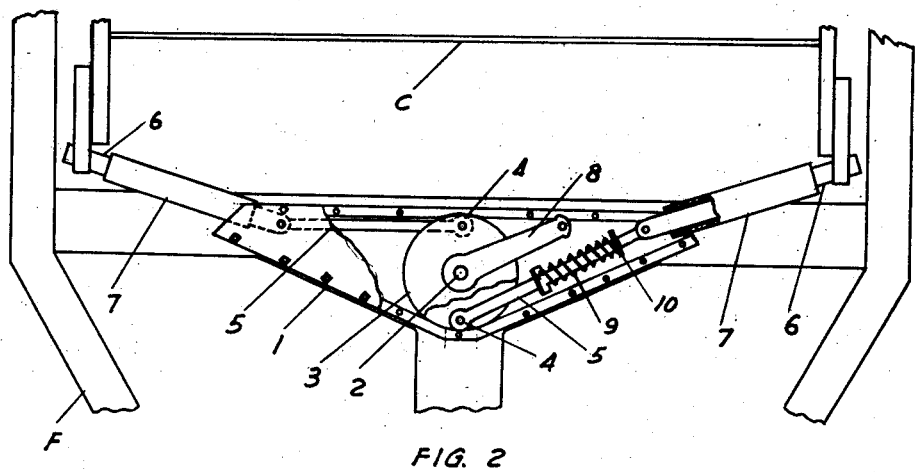
Fig. 2 is a plan view of my control means attached to the scraper with the upper cover plate of the control means removed.
Figure 3:
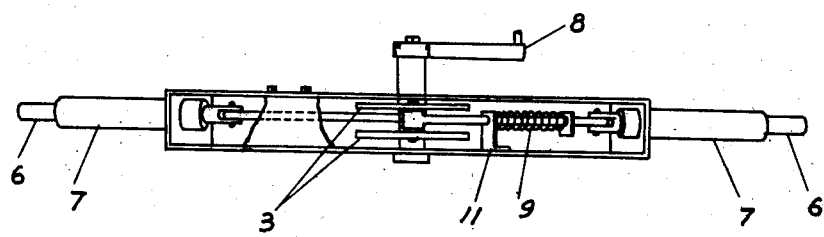
Fig. 3 is a front view of the control means with the front wall of the control box removed.
Figure 1:
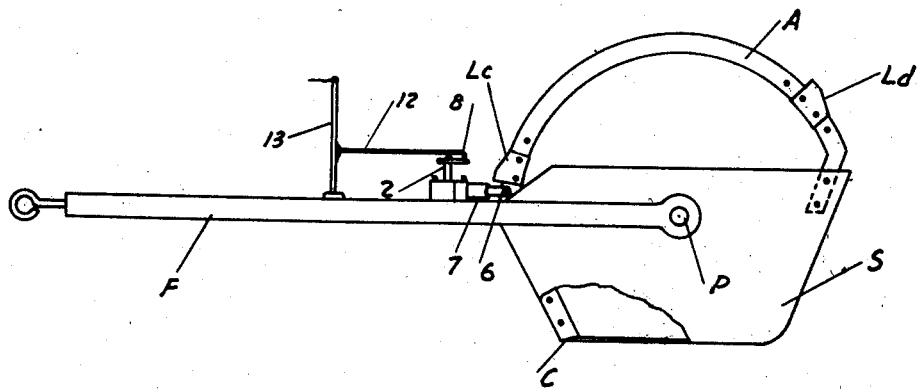
Fig. 1 is a side view of a scraper provided with my control means.

In the drawing wherein for the purpose of illustration is shown a preferred form of my invention, the letter S designates generally the scraper itself. On the scraper frame F my invention in a scraper control is mounted. The scraping shell B consisting in two side plates $B_1$ and a scraper plate $B_2$ is pivoted in the frame F at pivot point P and it is provided with the usual cutting edge C.

The type of scraper here illustrated in the accompanying drawing is provided with a pair of arc rolling frames A to permit the pivoted scraper body B to roll over and over through dumping and scraping position when the control means, to be described later, is held in the out position.

The aforementioned arc frames A are located at the extreme ends of the scraper shell B and each is provided with similarly placed stop lugs $L_c$ which cooperate with my control means to hold the scraping shell B in scraping position. The arc frames A are provided with a second set of similarly placed stop lugs $L_d$ for the purpose of cooperating with my control means to hold the scraper in dumping position.

Before describing in detail my invention in a scraper control, a few statements as to the present state of the art on scraper controls will be helpful. I do not claim to be the first person to provide a scraper control. There are a number of types of scraper control on the market, the most practical of which constitute a revolvable shaft with a means extending from it that may be revolved into the path of lugs, or the like, on the scraper shell to stop it in either loading position or dumping position.

My experience and observation have shown me that these prior art types of scrapers are not sensitive enough for fast operation because of the fact that these controls under fast operating conditions are not quick enough after the release of the scraping lugs, or equivalent, to engage the dumping lugs, or their equivalent, before they go by, with the result that the scraper shell makes a complete revolution and ends up again in scraping position with part of its load in the shell.

To overcome these defects in scraper controls, I have worked out a scraper control that works on an entirely different principle.

In my scraper control, as shown in the drawing, numeral 1 designates a shell in which is housed some of the working parts of the control. On a stud shaft 2, rotatably mounted on the lower wall of the shell 1 extending upward, I rigidly mount a pair of revolvable shifting discs 3. I join the upper shifting disc 3 to the lower shifting disc 3 by means of two wrist pins 4 spaced along a diameter of the discs 3 at opposite sides of the stud shaft 2 and equally spaced from it. On these wrist pins 4 I have rotatably mounted shifting links 5. The links 5 are given lineal motion when the discs are revolved. The lineal motion of the shifting links 5 is translated to plungers 6, to which they are also pivotably attached. The plungers 6 are slidably mounted in tubular guides 7, so positioned as to direct the plungers into the path of the aforementioned stop lugs $L_c$ and $L_d$ on the arc frames A to stop the scraper shell B from rotating.

As a means for shifting the plungers into stopping position, I rigidly mount a crank 8 on the stud shaft 2 on which the shifting plate assembly with shifting links 5 is mounted. With this arrangement a turn of the crank 8 revolves the disc assembly to cause the links 5 to receive lineal motion and to in turn impel the plungers 6 to move. A right hand turn of the crank retracts the plungers from the normal stopping position.

I depend upon returning the plungers to their normal stopping position by a spring return means. This spring return means, as illustrated in the drawing, is the helical spring 9 shown surrounding the right shifting link 5, together with the thrust collar 10 rigidly mounted on the link 5. One end of the spring engages the thrust collar 10, while the other end of it engages a stop 11 rigidly mounted on the lower plate of the shell 1.

When the crank is turned to the right the plungers 6 are retracted from stopping position and spring 9 is compressed. When the lever is released the spring 9 expands and pushes the right link 5 and connected plunger 6 out of the shell to engaging position. The link 5 also turns the shifting disc assembly, which in turn shifts the other plunger 6 by means of the shifting link 5 connecting it to the shifting disc assembly.

The mechanism thus far described explains the construction and operation of a workable, practical plunger type scraper control. When it is desired to cause the scraper to scrape, the crank 8 is released to allow the spring 9 to set the plungers in position to contact the scraping lugs Lc to hold the scraper in scraping position. When the scraper shell B is filled with dirt and ready to be emptied, the operator merely turns the crank 8 a part turn clockwise to retract the plungers 6 and allow the scraping lugs Lc to roll by. The reaction of the ground against the cutting edge C and body of the shell makes it revolve. As soon as the lugs Lc pass the operator releases the crank 8 to allow the spring 9 to quickly return the plungers 6 to the dumping position to contact the lugs Ld and hold the scraper in dumping position as long as necessary to completely dump the load.

After the load is dumped the operator again turns the lever 8 in a clockwise direction to release the plungers 6. Then he releases it as before to allow the plungers 6 to be thrown out by the spring 9 to again engage the stop lugs Lc to hold the scraper again in scraping position.

For the convenience of the operator, who sits on a seat on the scraper or on a tractor seat not shown, I extend from the crank 8 a pull rod 12 to a lever 13 which is pivoted to the frame F of the scraper. To the free end of the lever 13 I extend a cable, chain, or the like, up to the driver's seat. By means of this cable and lever arrangement the driver may operate the control means by merely pulling on the cable or chain, or the like, as the case may be.

Having thus described my invention and the operation of the same, what I claim is:

1. A scraper comprising a frame, side plates turnably mounted therein, a scraper plate fixed thereto, arc shaped ribs mounted upon said side plates, stop lugs on said ribs, plungers reciprocably mounted on the frame for movement into and out of the path of the stop lugs in direction sidewise with respect to the planes of the lugs and ribs, and a means for operating the said plungers including a crank mounted on the frame to turn in a substantial horizontal plane.

2. The device as claimed in claim 1 including a spring means for throwing the plungers into the paths of the lugs.

3. A road scraper comprising a frame, a scraper body rotatably mounted in the said frame, said scraper body comprising a pair of side plates, a scraper plate extending between the side plates and an arc shaped rib mounted on each of the side plates in the planes of the side plates, said arc shaped ribs having stop lugs extending outwardly, a control means including a pair of reciprocating plungers mounted on the frame to permit the plungers to be moved into and out of the path of the said stop lugs, said control means including a rotatably mounted disc on the frame and a pair of links attached to the disc on opposite sides of the same and having their other ends connected to the reciprocating plungers and a crank connected to the disc for turning the same.

4. The device as claimed in claim 3 including a spring actuated means for throwing the reciprocating plungers into the path of the lugs, said spring actuated means comprising a spring, a stop against which one end of the spring rests and a thrust collar mounted on one of the links against which collar the spring pushes.

JOHN W. BARNWELL.